US011465359B2

(12) United States Patent
Vasil et al.

(10) Patent No.: US 11,465,359 B2
(45) Date of Patent: Oct. 11, 2022

(54) PREVENTION OF UNAUTHORIZED PARTS FROM BEING 3D-PRINTED

(71) Applicant: General Electric Company, Schenectady, NY (US)

(72) Inventors: Christina Vasil, Troy, NY (US); Arvind Rangarajan, San Ramon, CA (US); Benjamin Edward Beckmann, Niskayuna, NY (US); Steven J. Duclos, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 677 days.

(21) Appl. No.: 16/436,240

(22) Filed: Jun. 10, 2019

(65) Prior Publication Data

US 2020/0269511 A1 Aug. 27, 2020

Related U.S. Application Data

(60) Provisional application No. 62/811,076, filed on Feb. 27, 2019.

(51) Int. Cl.
*G06Q 20/00* (2012.01)
*B29C 64/393* (2017.01)
(Continued)

(52) U.S. Cl.
CPC ........ *B29C 64/393* (2017.08); *G05B 19/4099* (2013.01); *G06F 21/6209* (2013.01);
(Continued)

(58) Field of Classification Search
CPC ............. B29C 64/393; G05B 19/4099; G05B 2219/49023; G06F 21/6209; G06F 21/64;
(Continued)

(56) References Cited

U.S. PATENT DOCUMENTS 7,551,807 B2 6/2009 Choi et al.
10,063,529 B2 8/2018 Milazzo et al.
(Continued)

FOREIGN PATENT DOCUMENTS

CA 2821920 1/2015
WO 2018158282 A1 9/2018

OTHER PUBLICATIONS

International Searching Authority, "Search report and Written Opinion," issued in connection with PCT patent application No. PCT/US2020/020114, dated May 4, 2020, 12 pages.
(Continued)

*Primary Examiner* — Dante Ravetti
(74) *Attorney, Agent, or Firm* — Hanley, Flight & Zimmerman, LLC (57) ABSTRACT

According to some embodiments, systems and methods are provided comprising receiving, via a communication interface of an authorization module comprising a processor, a part file with instructions to manufacture one or more parts with an additive manufacturing machine; generating a shape signature for the part based on the part file; providing a data store storing one or more stored shape signatures, wherein the one or more stored shape signatures are one of an authorized-to-print stored shape signature and an unauthorized-to-print stored shape signature; determining the generated shape signature of the part corresponds to at least one of the authorized-to-print stored shape signatures or at least one of the unauthorized-to-print stored shape signatures; and receiving the determination of whether the generated shape signature of the part corresponds to at least one authorized-to-print stored shape signature or at least one unauthorized-to-print stored shape signature. Numerous other aspects are provided.

20 Claims, 8 Drawing Sheets

(51) Int. Cl.
  *G06F 21/62* (2013.01)
  *G05B 19/4099* (2006.01)
  *B33Y 50/02* (2015.01)
  *B33Y 40/00* (2020.01)
(52) U.S. Cl.
  CPC .............. *B33Y 40/00* (2014.12); *B33Y 50/02* (2014.12); *G05B 2219/49023* (2013.01)
(58) Field of Classification Search
  CPC ......... G06F 21/10; B33Y 40/00; B33Y 50/02; B33Y 50/00; Y02P 10/25; B22F 10/20; B22F 10/30; H04L 9/3239; H04L 9/50
  USPC ................... 705/16, 21; 380/44, 263
  See application file for complete search history.

(56) References Cited

U.S. PATENT DOCUMENTS

| | | | |
|---|---|---|---|
| 2009/0240907 A1* | 9/2009 | Crandell | ................ G06F 21/31 711/E12.001 |
| 2014/0058959 A1 | 2/2014 | Isbjornssund et al. | |
| 2017/0157859 A1 | 6/2017 | Mahdavi et al. | |
| 2018/0173203 A1 | 6/2018 | Freer et al. | |
| 2018/0257306 A1 | 9/2018 | Mattingly et al. | |

OTHER PUBLICATIONS

Toshio Modegi,"Proposal for 3D-printing regulation technique in fabricating illegal objects using feature-vector based matching algorithm of 3D shapes," Of Instrument and Control Engineers of Japan (SICE), the Society of Instrument and Control Engineers—SICE, Sep. 20, 2016 (Sep. 20, 2016), 2 pages.

International Bureau, "International Preliminary Report on Patentability," issued in connection with PCT patent application No. PCT/US2020/020114, dated Aug. 25, 2021, 7 pages.

Bechtold, Stefan "3D Printing, Intellectual Property and Innovation Policy", IIC—International Review of Intellectual Property and Competition Law, vol. 47, Issue: 5, Aug. 2016, DOI:10.1007/s40319-016-0487-4, (pp. 517-536, 20 total pages).

Chen, Fei et al., "Security features embedded in computer aided design (CAD) solid models for additive manufacturing", Materials & Design, vol. 128, USA, Aug. 15, 2017, DOI: 10.1016/j.matdes.2017.04.078, (pp. 182-194, 13 total pages).

* cited by examiner

| Blacklist database example | |
|---|---|
| Parts | Shape signature data* |
| Handgun design 1 | [12, 19, 24, 27, 5, 27, 26, 13, 9, 34] |
| Handgun design 2 | [12, 20, 24, 30, 6, 27, 26, 14, 9, 34] |
| ... | |
| Handgun design N | [11, 19, 22, 27, 6, 28, 26, 13, 9, 35] |
| Gun silencer design 1 | [31, 25, 26, 27, 19, 24, 27, 19, 27, 42] |
| Gun silencer design 2 | [31, 22, 25, 27, 21, 24, 26, 4, 29, 42] |

PREVENTION OF UNAUTHORIZED PARTS FROM BEING 3D-PRINTED

CROSS REFERENCE TO RELATED APPLICATION

The present application claims priority from the following U.S. Provisional Patent Applications, which is hereby incorporated by reference herein in its entirety for all purposes: U.S. Provisional Patent Application Ser. No. 62/811,076, filed Feb. 27, 2019, and entitled "Prevention of Black-listed Parts from being 3D-Printed".

BACKGROUND

An additive manufacturing system and process may be used to create a three-dimensional item. A user may want to obtain a three-dimensional item, such as a nozzle for a jet engine, a replacement part for a wind turbine, etc. In some cases, the user may have the part created by arranging to have a part file transmitted to an additive manufacturing platform. Currently, part files for a host of items may be publicly available. In some instances, the user may want to use the additive manufacturing platform to create items from these publicly available part files, where the items include illicit geometries, without authorization.

It would be desirable to provide systems and methods to determine whether an item is authorized to be created via an additive manufacturing process.

BRIEF DESCRIPTION

According to some embodiments, a method includes receiving, via a communication interface of an authorization module comprising a processor, a part file with instructions to manufacture one or more parts with an additive manufacturing machine; generating a shape signature for the part based on the part file; providing a data store storing one or more stored shape signatures, wherein the one or more stored shape signatures are one of an authorized-to-print stored shape signature and an unauthorized-to-print stored shape signature; determining the generated shape signature of the part corresponds to at least one of the authorized-to-print stored shape signatures or at least one of the unauthorized-to-print stored shape signatures; and receiving the determination of whether the generated shape signature of the part corresponds to at least one authorized-to-print stored shape signature or at least one unauthorized-to-print stored shape signature.

According to some embodiments, a system includes an authorization module including a decision module and a geometric analysis module; an authorization processor; and a memory storing program instructions, the authorization processor and the authorization module operative with the program instructions to perform the functions as follows: receive a part file with instructions to manufacture one or more parts with an additive manufacturing machine; generate a shape signature for the part based on the part file; provide a data store storing one or more stored shape signatures, wherein the one or more stored shape signatures are one of an authorized-to-print stored shape signature and an unauthorized-to-print stored shape signature; determine the generated shape signature of the part corresponds to at least one of the authorized-to-print stored shape signatures or at least one of the unauthorized-to-print stored shape signatures; and receive the determination of whether generated shape signature of the part corresponds to at least one authorized-to-print stored shape signature or at least one unauthorized-to-print stored shape signature.

According to some embodiments, a non-transitory computer readable medium stores instructions that, when executed by a computer processor, cause the computer processor to perform a method including: receiving, via a communication interface of an authorization module comprising a processor, a part file with instructions to manufacture one or more parts with an additive manufacturing machine; generating a shape signature for the part based on the part file; providing a data store storing one or more stored shape signatures, wherein the one or more stored shape signatures are one of an authorized-to-print stored shape signature and an unauthorized-to-print stored shape signature; determining the generated shape signature of the part corresponds to at least one of the authorized-to-print stored shape signatures or at least one of the unauthorized-to-print stored shape signatures; and receiving the determination of whether the generated shape signature of the part corresponds to at least one authorized-to-print stored shape signature or at least one unauthorized-to-print stored shape signature.

A technical effect of some embodiments of the invention is an improved and/or computerized technique and system for authorizing fabrication of parts via additive manufacturing (AM). One or more embodiments provide for the identification of unapproved build files/parts based on similarity to previously tagged unapproved items, without needing the unapproved build file/part to exactly match the previously tagged unapproved item. There may be several ways in which a part would qualify as having an illicit (unapproved) geometry if not printed by a proper authority: 1. The part may be patented or copyrighted; 2. The design may be export controlled (EC), and 3. The type of part may require a license to manufacture/be a regulated item (e.g., missiles). Other suitable ways may be included. One or more embodiments provide an authorization module that may determine whether a part is authorized for fabrication via AM based on the part geometry's similarity to items in a pre-determined "blacklist" or items in a pre-determined "whitelist". The blacklist may be a storage element containing geometric information on illicit geometries. Illicit geometries may include, but are not limited to, firearms, missiles, export-controlled geometries, weapons of mass destruction and patented or copyrighted geometries. The whitelist may be a storage element containing geometric information on specifically-authorized geometries. One or more embodiments may provide for the determination of a probability that a part geometry is on a whitelist or a blacklist. Further, a weight of each of the whitelist probability and the blacklist probability may be combined to determine whether the part geometry is authorized. Machine learning may be used, in one or more embodiments, to improve accuracy of: the probability score associated with matching the parts to whitelist/blacklist parts; and a statistical significance. One or more embodiments may provide for the use of a secure, distributed ledger (block-chain) to uniquely store geometric signature data for the part securely, and for a publicly distributed blockchain or distribution within a given organization. Embodiments may provide for the application of a shrink-wrap function to a geometry for a part before comparison to stored geometries to ensure a more accurate comparison for lattice-structured parts. Embodiments may provide for the identification of parts that are negatives of authorized/unauthorized geometries to identify builds of molds for authorized/unauthorized geometries. As used herein, the term "unauthorized" and "illicit" and "unapproved" may be used interchangeably.

Another technical effect of one or more embodiments is the identification of parts through partial matching to find assemblies that are printed in pieces (e.g., a barrel for a firearm and a handle for a firearm). In one or more embodiments, an active blockchain may be used to identify these different parts in an assembly being printed generally, and in some instances across multiple machines, possibly in multiple locations, where an assembly is composed of two or more parts.

Embodiments may allow for users/original equipment manufacturers (OEMs)/manufacturers/government to carefully control which parts are authorized to be printed and are not authorized to be printed. Embodiments may not be dependent on a manufacturing modality.

With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DETAILED DESCRIPTION

As 3D printing (additive manufacturing) becomes more accessible to individuals around the world, so does the potential to print contraband, including weapons and explosive components. Currently, given an additive build file, a machine user may print virtually any geometry with no safety checks—a problem inherent to AM. Today, with access to the internet, users may download sensitive files of these illicit parts and load them in an additive manufacturing machine (AMM) to be printed. As a non-exhaustive example, a geometry for "The Liberator," a plastic, additively—manufacturable firearm was released to the public via the internet.

Current efforts to address the manufacture of illicit parts via AMM include a process to download a geometry file containing firearms, slightly modify the geometry such that it renders the firearm ineffective, and re-upload the altered geometry file back to the internet to intentionally proliferate faulty firearm files. However, this approach is rendered ineffective for those capable of 3D design, as they may re-alter a faulty geometry, and/or create a new geometry from scratch. This approach is also rendered ineffective for those who have other sources for acquiring such files.

One or more embodiments provide for an authorization module with the capability of additive machines to print unauthorized parts. The authorization module may use shape recognition processes, blockchain technology, and artificial intelligence to identify and prohibit the production of unauthorized parts. The authorization module may allow part geometries to be reduced to shape signatures for purposes of fast, simple, and accurate comparison, enabling same or similar (i.e. non-exact) geometries to be detected as matches.

Figure 1:
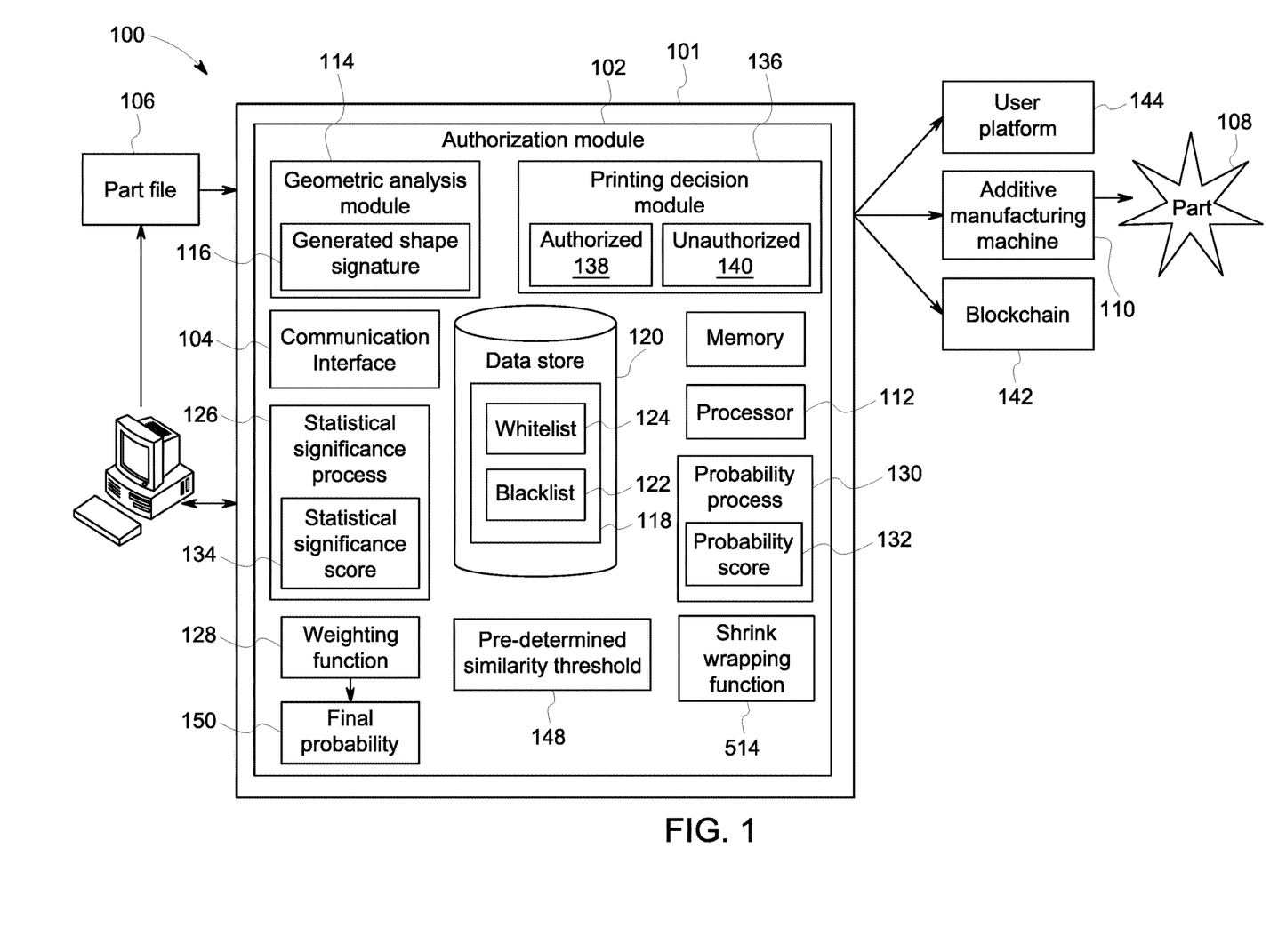
FIG. 1 illustrates a system according to some embodiments
Figure 2:
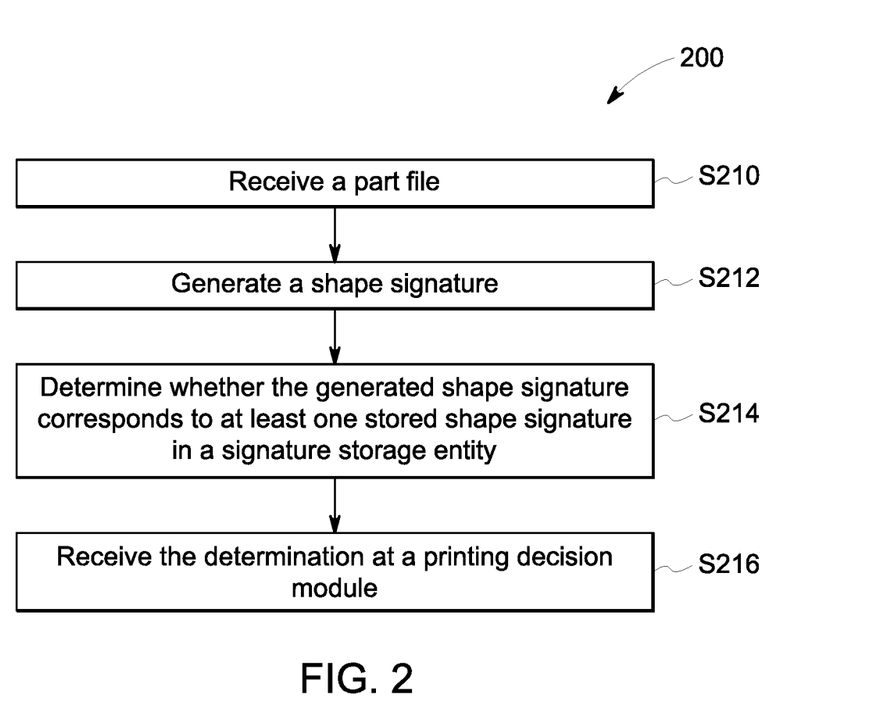
FIG. 2 illustrates a flow diagram according to some embodiments.

Turning to FIGS. 1-6, a system 100 and diagrams of examples of operation according to some embodiments are provided. In particular, FIG. 2 provides a flow diagram of a process 200, according to some embodiments. Process 200 and other processes described herein may be performed using any suitable combination of hardware (e.g., circuit(s)), software or manual means. In one or more embodiments, the system 100 is conditioned to perform the process 200 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto.

In one or more embodiments, the system 100 may include a platform 101, an authorization module 102, a communication interface 104, a memory/data store 120 (e.g., database), and user platform 144. In one or more embodiments, the authorization module 102 may reside on the platform 101. Platform 101 provides any suitable interfaces through which users 144/other systems (e.g., AMM machine 110, block chain 142) may communicate with the authorization module 102.

In one or more embodiments, the output of the authorization module 102 may be output to a user platform 144 (a control system, a desktop computer, a laptop computer, a personal digital assistant, a tablet, a smartphone, etc.) to view information about and/or manage the operation of the system in accordance with any of the embodiments described herein. In one or more embodiments, the output of the module 102 may be used to control the AMM 110. In one or more embodiments, the output from the authorization module 102 may be transmitted to various user platforms 144 or to other system (110, 142), as appropriate (e.g., for display to, and manipulation by, a user).

In one or more embodiments, the system 100 may include one or more processing elements 112. The processor 112 may, for example, be a microprocessor, and may operate to control the overall functioning of the authorization module 102. In one or more embodiments, the communication interface 104 may allow the processor 112 and hence the authorization module 102, to engage in communication over data networks with other devices.

In one or more embodiments, the system 100 may include one or more memory and/or data storage devices 120 that store data that may be used by the module. The data stored in the data store 120 may be received from disparate hardware and software systems associated with the system, or otherwise, some of which are not inter-operational with one another. The systems may comprise a back-end data environment employed by a business, industrial or personal context.

In one or more embodiments, the data store 120 may comprise any combination of one or more of a hard disk drive, RAM (random access memory), ROM (read only memory), flash memory, etc. The memory/data storage devices 120 may store software that programs the processor 112 and the authorization module 102 to perform functionality as described herein.

As used herein, devices, including those associated with the system 100 and any other devices described herein, may exchange information and transfer input and output ("communication") via any number of different systems. For example, wide area networks (WANs) and/or local area networks (LANs) may enable devices in the system to communicate with each other. In some embodiments, communication may be via the Internet, including a global internetwork formed by logical and physical connections between multiple WANs and/or LANs. Alternately, or additionally, communication may be via one or more telephone networks, cellular networks, a fiber-optic network, a satellite network, an infrared network, a radio frequency network, any other type of network that may be used to transmit information between devices, and/or one or more wired and/or wireless networks such as, but not limited to Bluetooth access points, wireless access points, IP-based networks, or the like. Communication may also be via servers that enable one type of network to interface with another type of network. Moreover, communication between any of the depicted devices may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

Turning to the process 200, initially, at S210, an authorization module 102 may receive, via a communication interface 104, a part file 106 with instructions to manufacture one or more parts 108 with an additive manufacturing machine 110. The part file 106 may be one of a geometry file or a build file. The part 108 may include, but is not limited to, a turbine blade, a bracket, artillery, a fuel nozzle, a door knob, etc. It is noted that a geometry file may include the geometry for the part, and may need to be converted to a build file prior to receipt by the additive manufacturing machine 110. A build file may include the outline of the shape, layer-by-layer, in a machine-readable instruction. The part file 106 may be in the form of a CLS file, or any other suitable format.

It is noted that the authorization module 102 may be deployed at at least two points in the additive design-to-manufacture process: 1) when a build file is generated from a CAD geometry (e.g., a CLS file) and 2) when a build file is loaded to be printed on a machine, further securing the supply chain. The authorization module 102 may be independent of the AMM architecture and additive manufacturing modality, allowing for a more universal and sustainable solution.

The authorization module 102 may include a geometric analysis module 114 and a printing decision module 136. The geometric analysis module 114 may execute a shape characterization process to generate a shape signature 116 for the part 108 based on the part file 106 at S212. The shape signature 116 may be a compact representation for some essence of a shape. As a non-exhaustive example, to generate a shape signature for a cylinder, an infinite number of points may be drawn from a centroid of the cylinder to all other points along the surface of the cylinder in every direction. Then, the distance from the centroid to each point may be recorded to create a distribution, which may be displayed in a histogram, for example. Different shapes may have different unique distributions of points, resulting in a shape signature. The shape signature 116 may capture some global geometric properties which are scale, translation, and rotation invariant. It is noted that the shape signature 116 may not map to a particular shape, rather, it may just determine where a cord ends as a way to represent geographic data. The inventors note that by just storing the shape signature, the shape cannot be reverse engineered, further preventing unauthorized printing of controlled parts. As a first step in the generation of the shape signature 116, the geometric analysis module 114 may reconstruct a stereolithography (STL) file from the part file, or any other suitable file format. The STL file may be pose-normalized, assuring that the geometry is rotated, translated, and scaled appropriately. The distributions of maps of distance, angle or curvature may be used to calculate a unique shape signature. Some non-exhaustive examples of shape signature processes include spherical harmonic decomposition and Zerinke polynomials. The shape signature 116 may include one or more dimensions for the part (including, but not limited to, center-to-surface-point distances, surface-point-to-farthest-surface-point distances, etc.). For example, a handle for a firearm may include two dimensions: a cylinder and a notch. Each of the one or more dimensions may include a weight. In one or more embodiments the weight may be related to the uniqueness of the dimension. For example, with the firearm handle, the notch may be a more unique feature or dimension than the cylinder. The shape signature 116 may be output or represented as an array of data 304 (e.g., FIG. 3), which may include representation as a histogram 400 (e.g., FIG. 4), or otherwise suitably represented. It is noted that by representing the shape signature as an array of data, it may not necessarily be mapped to a particular shape. As a non-exhaustive example, when the shape signature is a histogram, a function may store a height of the bars in the histogram for comparison, or for each bin (bar) in the histogram, a height may be assigned to the bin and the data may be ordered by the heights, such that the order may be used for comparison. It is noted that ordering features (histogram bins) by value (height), for comparison may be used when the feature set is unknown or intentionally not fully known, allowing for the identification of correlations. In instances where known feature comparison is desired, the ordering may be by something different than values (height). In one or more embodiments, any other suitable process for comparison may be used. As described further below, for geometries that include large internal holes, the negative geometry may be computed and also checked against the database (to account for potential mold prints).

The generated shape signature 116 for the part 108 is then analyzed with respect to one or more stored shape signatures 118, stored in the data store 120. In one or more embodiments, the data store 120 may be at least one database, or other suitable storage entity. The stored shape signatures 118 may be provided to the data store 120 via public domain (e.g., files from the internet), the government, self-created. It is noted that the signature storage entity 120 may store the stored shape signatures (e.g., array of data 304) 118 and not the actual geometry files from which they are derived. The data store 120 may include stored shape signatures 118 that are categorized as "blacklist" 122 or "whitelist" 124. In one or more embodiments, the data store 120 may include separate databases for blacklist and whitelist parts, or may include both items in a single database. The whitelist parts may be items of approved geometries from enterprise databases, while the blacklist parts may be items published by—for example—firearms manufacturers/suppliers, government entities, the Department of Justice, etc., or any other suitable party. It is noted that at least one of the blacklist of stored shape signatures 122 and whitelist of stored shape signatures 124 may be stored as part of a blockchain 142, as described further below.

Figure 3:
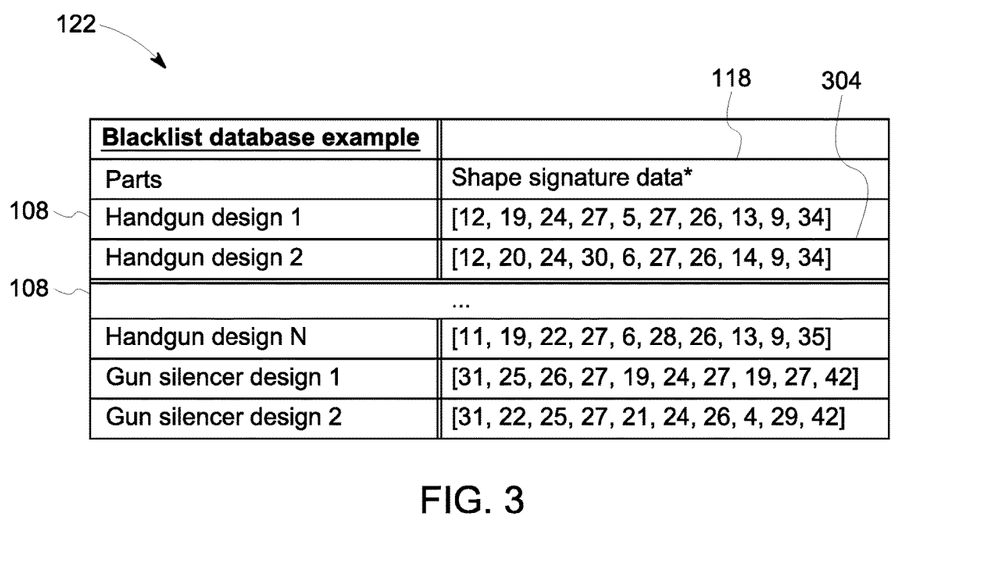
FIG. 3 illustrates a non-exhaustive example of a blacklist database according to some embodiments.
Figure 4:
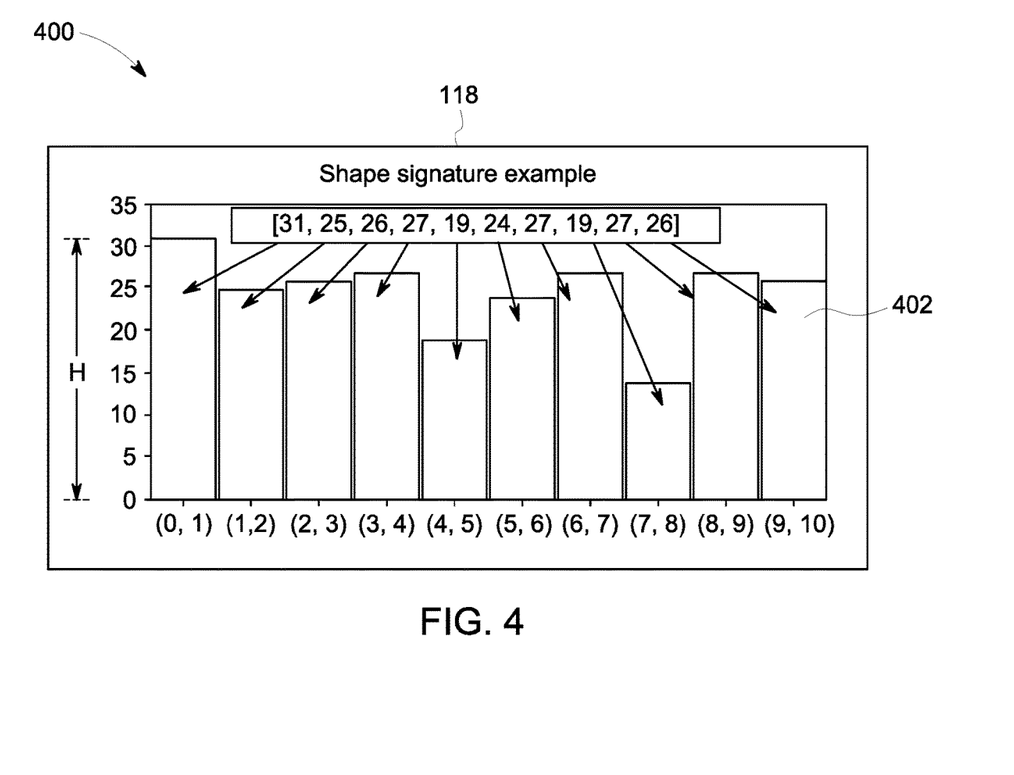
FIG. 4 illustrates a non-exhaustive example of a shape signature according to some embodiments.

With respect to FIGS. 3 and 4, FIG. 3 is a non-exhaustive example of what a blacklist 122 may look like/contain. The stored shape signature data 118 may be stored in some form that is easy to compare with other signatures. The non-exhaustive example herein is the height (H), of the bins 402 in a histogram 400, where the histogram is shown in FIG. 4. Each bin 402 may represent a dimension, and may include "0" to "n" units. The comparison of the generated shape signature 116 to the stored shape signature 118 may be a measure of the similarity of the quantity in each same bin/dimension. The more similar the same bins/histograms are between the generated shape signature and the stored shape signature, the more likely the generated shape signature is a match for the stored shape signature. When the shape signatures of the histogram are represented in k-dimensional space (as shown below in FIG. 5), shape signatures having similar histograms may be closer to each other in the k-dimensional space. The determination that the generated shape signature is a match to the stored shape signature may be based on a comparison of the similarity to a pre-determined similarity threshold 148. The pre-determined similarity threshold 148 may be provided by a user (e.g., administrator), testing results, or any other suitable source. The pre-determined similarity threshold 148 may be a value or a range of values.

It is noted that some bins 402 of the histogram 400 may be more significant than others in determining a match between the generated shape signature and the stored shape signature. To that end, when the stored shape signature 118 is stored in the data store 120, a weighting may be assigned to the different dimensions, via a weighting function 128, to indicate their significance. As a non-exhaustive example, a cylinder may not be helpful in the determination of whether a part is a blacklist part or a whitelist part, but a notch in a cylinder may be more telling. The notch may show up in the histogram 400 as a different bin. While there may be many parts that are a cylinder, thus having the same/similar bins, less parts may include the notch. As such, it may be easier to determine whether the generated shape signature 116 matches the stored shape signature 118 based on this key dimension/bin 402. continuing with the non-exhaustive example in FIG. 3, the stored shape signature data 118 for the hand gun design parts 108 1 through N may be very dimensionally similar, with only a few numbers in the array 304 being slightly different from one another between designs. However, when looking at the gun silencer designs, while similar to each other, they differ from the hand gun design signature data.

In one or more embodiments, the authorization module 102 may determine the probability and statistical significance that the generated shape signature 116 corresponds to the stored shape signature 118 in at least one of the whitelist 124 or the blacklist 122 in S214. In one or more embodiments, the authorization module 102 may execute the analysis in S214 using a level-of-detail approach, or progressive matching, where large landmarks are checked first, and more detailed matching is checked progressively. This approach may dispel likely-approved parts quickly. As used herein, a blacklist part may be referred to as an "unauthorized-to-print" part and a whitelist part may be referred to as an "authorized-to-print" part.

The determination that the generated shape signature 116 corresponds to a stored shape signature 118 may be based on a probability score 132, a statistical significance score 134, and the application of a weighting function 128 to the probability score 132 and the statistical significance score 134. The probability score 132 may be output from a probability process 130. The probability score 132 is an indication that each of the dimensions of the generated shape signature 116 matches at least one of the dimensions of the stored shape signatures 118. In one or more embodiments, a statistical significance process 126 may output a statistical significance score 134 that indicates whether the probability score 132 is statistically significant. The statistical significance score 134 may be a measure of how likely it is that the probability determination is correct. In one or more embodiments, the statistical significance score 134 may be a p-value or any other suitable statistically significance score. It is further noted that exact matches between the generated shape signature 116 and stored shape signature 118 may not be necessary—using geometric analytical techniques, per the geometric analysis module 114, parts may be considered a match against the blacklist if they are within a defined degree of shape similarity, or if the geometry only matches a portion of a blacklist geometry 122 (i.e., it is a partial match). A non-exhaustive example of this would be if someone printed an illicit part in pieces (e.g., printing a barrel separate from the trigger), or where only a portion of the part matches a blacklisted item (e.g., there was a slight re-design of the handle, for example, so that it looks different, but all of the other functional parts of the handgun match the shape signature.

Figure 6:
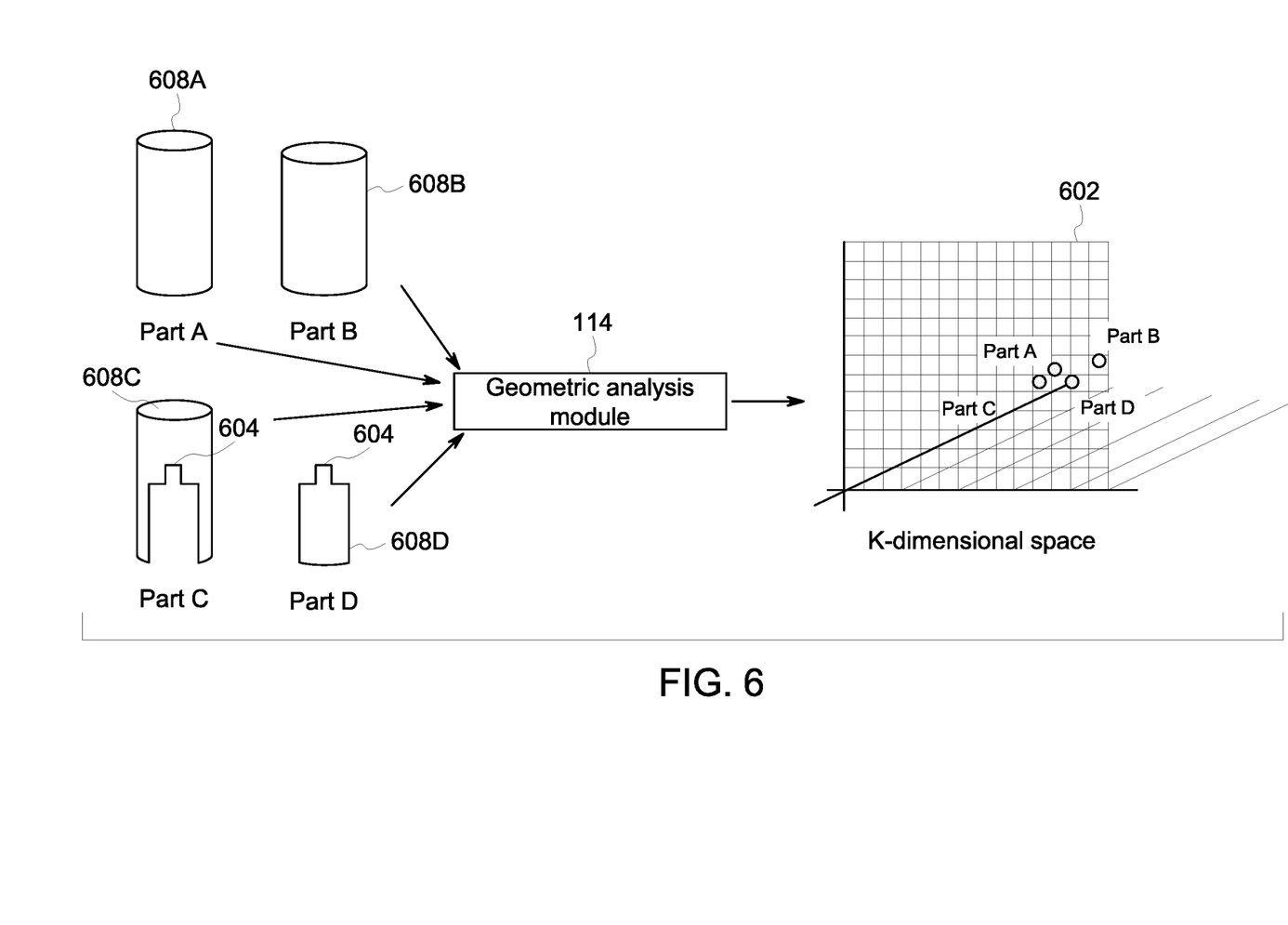
FIG. 6 illustrates a non-exhaustive example according to some embodiments.

With respect to the degree of shape similarity, consider, as a non-exhaustive example, four parts 608A, 608B, 608C and 608D provided in FIG. 6. The geometric analysis module 114 analyzes part files for each of the parts and generates a shape signature for each part, as described above with respect to S210 and S212. Shape signatures 116 for the four parts may then be characterized by mapping the shape signature onto a grid of k-dimensional space 602. The parts may be plotted as dots on the graph, and the proximity of the dots to each other may indicate the degree of shape similarity between the parts. Part C-608C and Part D-608D may fit together as a puzzle pieces, where Part C-608C may be a mold to form Part D-608D, for example. Further, Part A-608A and Part C-608C may both be similarly dimensioned cylinders. The relation between Parts A (608A), C (608C) and D (608D) may result in their being closer to each other in the grid 602 than any of them are to Part B (608B). As such, their degree of shape similarity when compared to a predefined threshold may make them "matches." Further, if the weighting function 128 is applied and the weight is imported to the k-dimensional space, the notch 604 in Part C (608C) and D (608D) may have a higher weight than the other dimensions, placing Part C (608C) and D (608D) closer together in the k-dimensional space relative to Parts A (608A) and B (608B). When the weights are applied, the degree of similarity between Parts A, B, C and D may indicate, when compared to the predefined threshold, that Parts C and D are a "match." In particular, the probability score 132 for Parts C and D may be higher than for parts A and C because while Parts A and C are similar in one dimension 9 e.g., cylinder dimension), parts C and D are similar in more than one dimension (e.g., notch; and an inside surface of the negative space (D) with positive space (C)—as further described below). Additionally, the notch may be assigned a higher weight than the other dimensions.

The authorization module 102 may also be able to work around other various loop holes, such as lattice structures and mold geometries (i.e., where the to-be-printed part is a negative shape of a blacklisted part).

Figure 5:
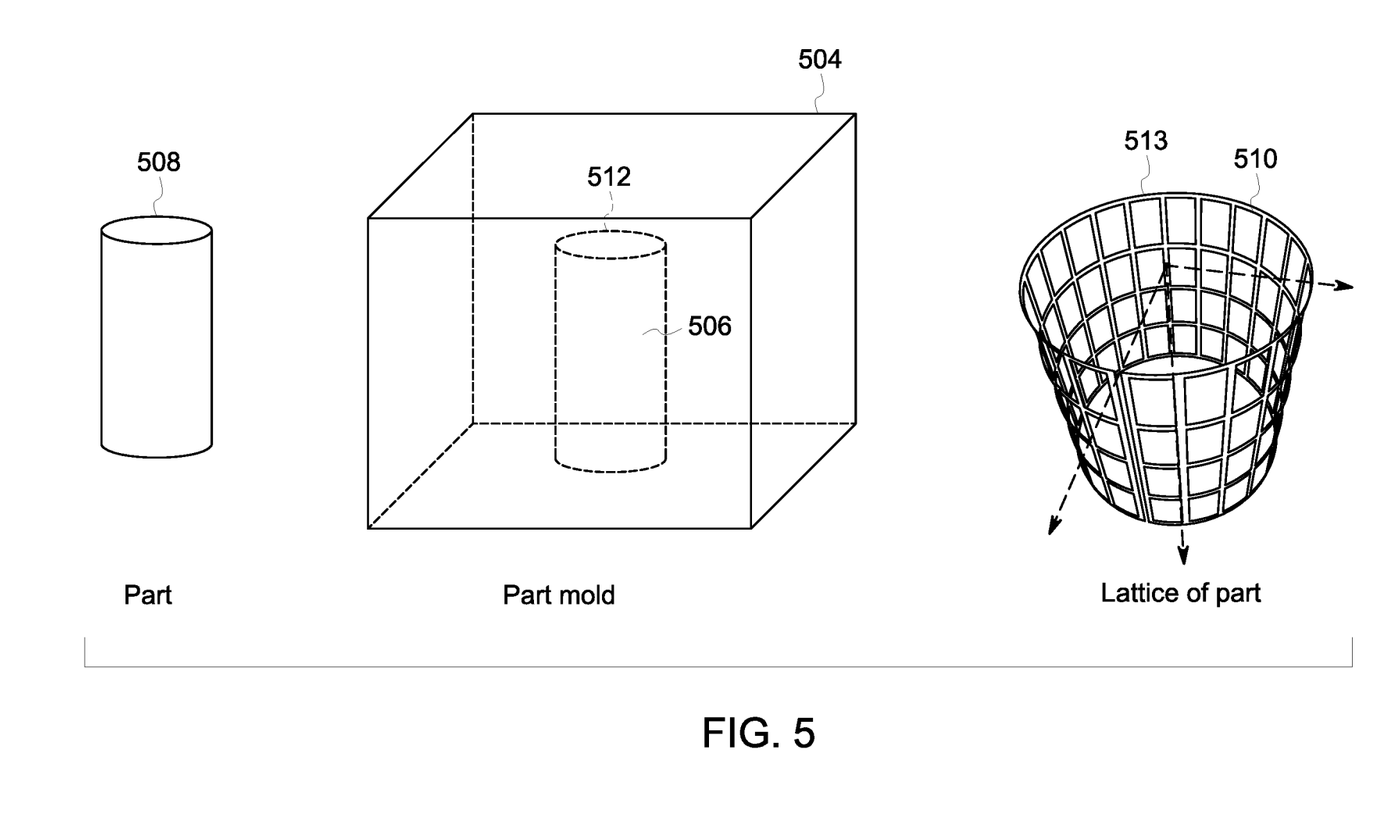
FIG. 5 illustrates a non-exhaustive example of parts according to some embodiments.

Regarding mold geometries and lattice structures, as a non-exhaustive example, consider the part 508 shown in FIG. 5. The part 508 may also be represented via part mold 504, which may be a box (or some other geometric shape), having a hole or negative space 506 therein. With the part mold 504, the authorization module 102 may determine whether the part file 106 includes a negative space of a pre-defined size. When the negative space of the pre-defined size is detected, the authorization module may use the geometric analysis module 114 to generate a shape signature for an inside surface 512 of the negative space. The inside surface 512 may represent the outside surface of the part. The authorization module 102 may then use the shape signature for the inside surface 512 in the determination described in S214. The part may also be represented via a lattice 510. The lattice 510 may be represented as a plurality of trusses 513 in the shape of a part. With a lattice, the process described above to generate the shape signature for the cylinder with the distance from an infinite number of points on a cylinder surface to a centroid of the cylinder, may result in a histogram that does not represent the shape, as the surface of the lattice is not solid, and the points are from the centroid to the trusses. In one or more embodiments, the authorization module 102 may determine whether the received part file 106 includes the lattice 510. As a non-exhaustive example, this may be determined statistically by seeing the distribution of surface-point-to-farthest-surface chord lengths (it may look different in lattice vs. non-lattice parts); or a ray-tracing, or similar, process where a vector may be shot across a plane intersecting the part, and it may be determined how many inner/outer faces exist. When it is determined the part file 106 does include the lattice 510, the authorization module 102 may apply a shrink-wrapping function 514, which may provide a "skin" over the lattice, and the process described above with the infinite number of points on the cylinder surface may be used, where the skin is used as the cylinder surface. Other suitable processes for determining a shape signature of a lattice may be used.

In one or more embodiments, after calculating whitelist and blacklist probability scores 132 and statistical significance scores 134, the probability scores 132 and statistical significance scores 134 may be passed through the weighting function 128 to determine a final probability 150 that the generated shape signature 116 matches a stored shape signature 118 in the blacklist 122 or whitelist 124.

The final probability 150 of the blacklist/whitelist determination may then be received at a printing decision module 136 at S216. The printing decision module 136 may make an ultimate decision on whether to print the part 108. In one or more embodiments, the printing decision module 136 may compare the final probability 150 to a pre-defined threshold (not shown) to make the decision. The decision made by the printing decision module 136 may be one of approved/authorized 138 vs. not approved/unauthorized 140. For transactions containing unauthorized parts, the generated shape signatures 116 may be added to the blacklist database 122. The inclusion in the blacklist database 122 may create a decentralized system which may be used to find parts that are unauthorized, whose designs may be drifting from the shape signatures 116 in the original blacklist database 122.

Figure 7:
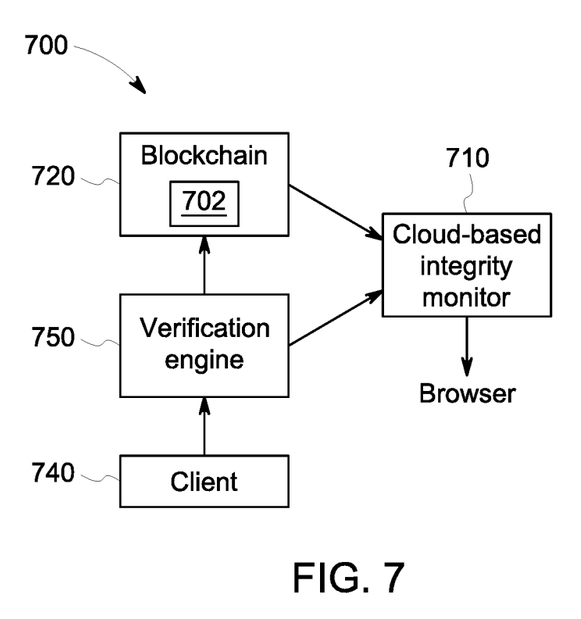
FIG. 7 illustrates a block diagram of a block chain according to some embodiments.

In one or more embodiments, these decisions (approved/authorized 138, not approved/unauthorized 140), along with the generated shape signatures 116 may be hashed and sent to a blockchain 142 to serve as a record or block 702 (FIG. 7). In one or more embodiments, if the part 108 is identified as a likely-blacklisted part, a number of options for recourse may be offered per the printing decision module 136, such as flagging for later investigation, stopping the build/printing of the part, the additive manufacturing machine 110 being locked/powered down and, reporting to the relevant authorities via a user platform 144.

With respect to the blockchain 142, FIG. 7 is a system 700 implementing shape signature verification using blockchain validation according to some embodiments. Each block 702 in a blockchain 720 may be a record that contains a cryptographic hash of the previous block (i.e., hashed shape signature), a timestamp and a transaction date. As such, each block is secured and bound to each other using cryptographic elements. A cloud-based integrity monitor 710 may provide shape signature integrity data via a web browser and exchange information with a blockchain 720 and a verification engine 750 via Representational State Transfer ("REST") web services. The REST web services may, for example, provide interoperability between computer systems on the Internet (e.g., by allowing requesting systems to access and manipulate textual representations of web resources using a uniform, predefined set of stateless operations). According to some embodiments, portions of the verification engine 750 may be associated with a MySQL database. In this way, the verification engine 750 and blockchain 720 can be used to provide shape signature level verification for a client 740 (e.g., a user). Although FIG. 7 illustrates a system 700 with a single blockchain 720 and verification engine 750, note that embodiments may employ other topologies. It is further noted that embodiments may be associated with any type of distributed ledger (blockchain) having a de-centralized consensus-based network that supports smart contracts, digital assets, record repositories, and/or cryptographic security. As a non-exhaustive example, the system 700 may manage the distributed ledger through a Peer-to-Peer ("P2P") protocol built on HTTP to maintain a single state that may be replicated at many nodes to support blockchains. Note that the environment for the system 700 may be a "locked down" and secured container with a set of signed base images that contain a secure OS and programming languages.

Based on the geometry's similarity to parts in the database, it may be assigned a blacklist probability score, or the likelihood of the part being a blacklisted part, and the statistical significance of said probability, as described above. This result along with analytical details on the part geometry may be added to the blockchain as a record, as described above. Blockchain may also be used to store, as a non-exhaustive example, the blacklist database, adding the benefit of distributed authority and mitigating the ability of users to alter the database. For active/networked machines, the blockchain-enabled blacklist database may be actively modified to include newly-found unauthorized geometries available on the internet, further improving control of the additive supply chain. Moreover, for active machines, the blockchain records may be used to determine if close-by machines are printing parts of an assembly in tandem, which may not individually trigger blacklist flags, but together form a blacklisted part. This may be determined based on things including, but not limited to similarity of parts (i.e., whether they appear to fit together or look like subcomponents of a blacklisted assembly), proximity of machines, and time stamps of build data sent to the blockchain.

Figure 8:
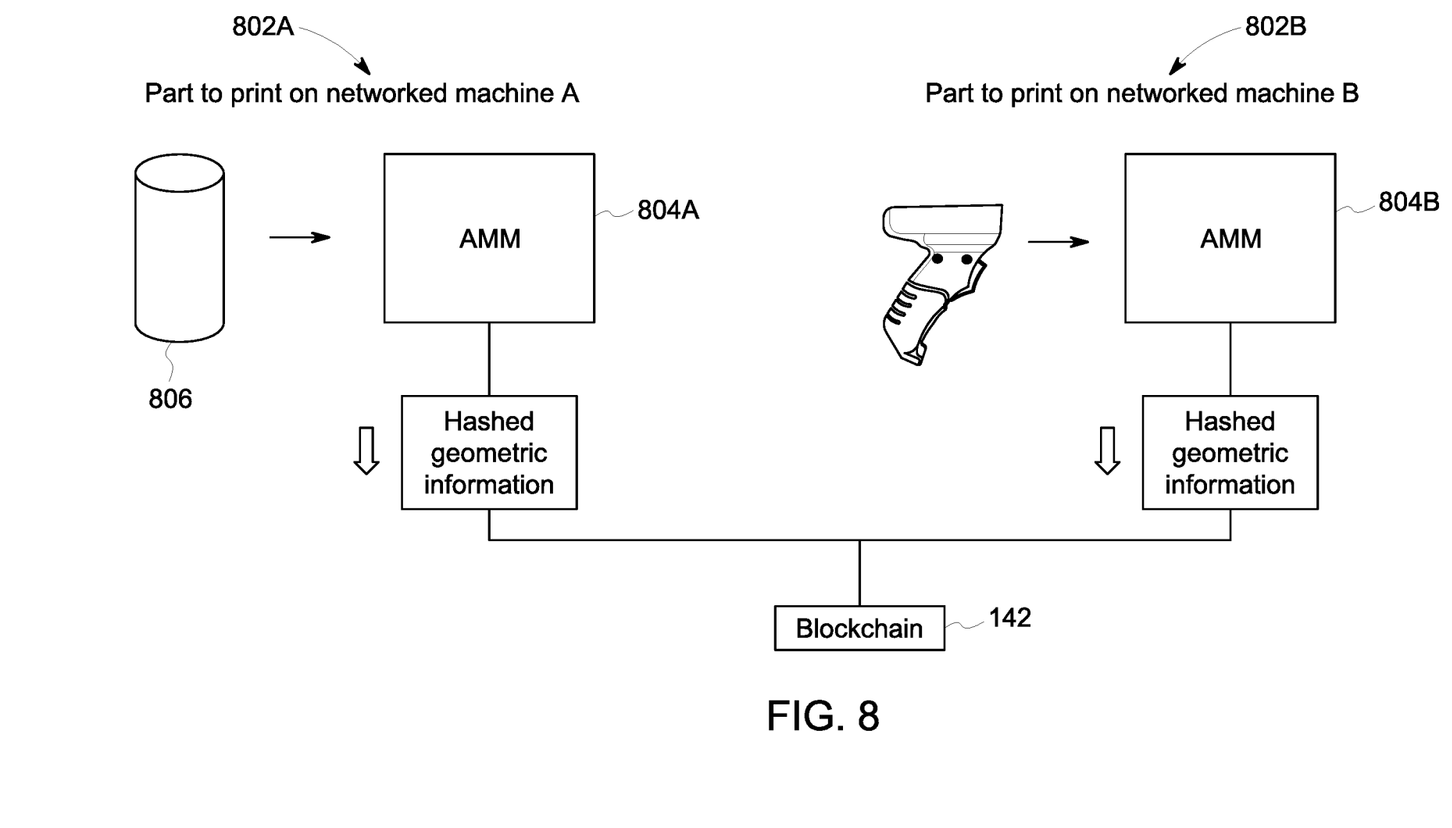
FIG. 8 illustrates a block diagram of a non-exhaustive example of a blockchain according to some embodiments.

In one or more embodiments, the authorization module 102 may check for partial matching between the generated shape signature 116 and the stored shape signature 118 for a part, as the user may not be printing a full assembly (e.g., the user may not be printing a complete product (assembly), but rather just one of a plurality of parts that together form a full assembly (complete product)). As a non-exhaustive example, shown in FIG. 8, AMM machine A 804A in location A 802A is printing gun barrel parts 806. The gun barrel may be just a cylinder, and by itself may not be on a blacklist. AMM machine B 804B in location B 802B, which is relatively near location A 802A, is printing handles with triggers. Both machine A and machine B are printing the parts at a same rate in real time. If the information for each of these parts (e.g., shape signature and/or probability, etc.) is sent to a public block chain 142 (e.g., both machine A and machine B are connected to the internet), the authorization module 102, which may monitor the block chain 142, (and, in embodiments, any other suitable block chain) may determine that together machine A and machine B are printing parts that when put together to form a full assembly are on the blacklist 122. For example, the authorization module 102 may determine machine A and machine B are working together based on time of received blocks, geometric information similarity and location of machines based on IP addresses. The printing decision module 136, may then determine the parts produced by machine A and machine B are unauthorized 140 and an appropriate action may be taken. As another non-exhaustive example, partial matching may be parts produced within the same machine, but printed separately on a same build plate, or printed at separate points in time.

As described herein, the authorization module 102 may utilize computational geometric techniques to identify potentially unauthorized parts intended for printing. In one or more embodiments, the authorization module 102 may learn and improve its capability for detection over time through the use of machine learning. After geometric analysis, the authorization module 102 may store each part geometry (e.g., shape signature) as a transaction with metadata (how likely it is to be a blacklisted part and metrics about geometrical features) via blockchain, which may enable auditability, if required, as described above. This may allow printers of unauthorized parts to be traced. Additionally, the authorization module 102 may 1. For networked or non-networked machines, identify subversive techniques that may help identify parts that have geometrically "drifted" from the blacklisted geometry. For example, over time, as parts are non-exact matches with blacklisted items, but are deemed to be black-listed items, the information for these parts may be added to the database, to capture a wider set of parts. The blacklisted database would then cover parts that are slightly different from the new geometry that was just added; and then those slightly different parts may be used to cover parts slightly different from them, etc., 2. For networked or non-networked machines, find more patterns across blacklisted parts and search for such characteristics in new geometries (e.g., by increasing the entries in the stored black/white list, there may be more items for new geometries to be compared to), and 3. For networked machines, identify coordinated additive machines that are working together to build an assembly of parts that is unauthorized, as described above with respect to FIG. 8. This may allow the authorization module 102 to stay relevant over time through self-maintenance. It should also be noted this authorization module 102 may be coupled with a "whitelisting" technology, where machines are only permitted to print a given set of parts (i.e., the whitelist), further preventing unwanted builds.

Figure 9:
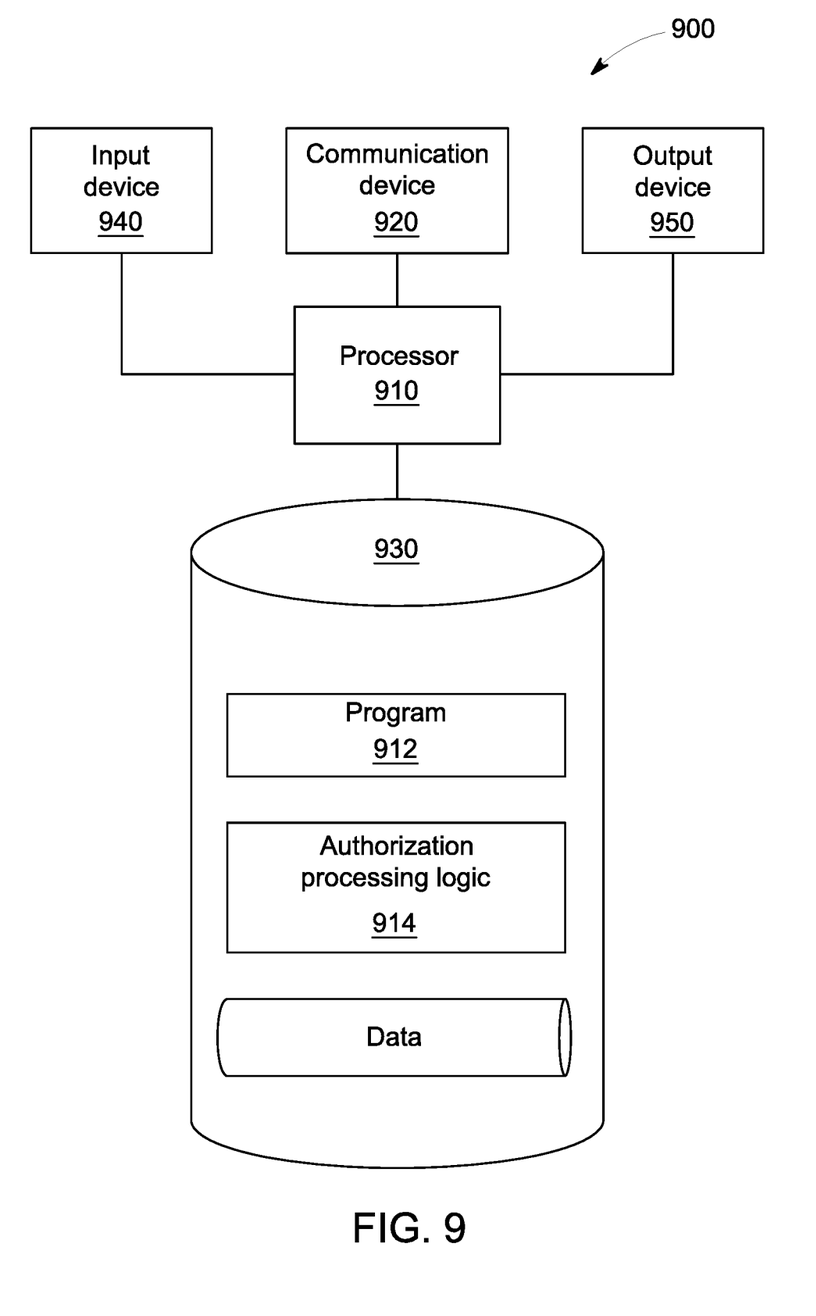
FIG. 9 illustrates a system according to some embodiments.

Note the embodiments described herein may be implemented using any number of different hardware configurations. For example, FIG. 9 illustrates an authorization platform 900 that may be, for example, associated with the system 100 of FIG. 1. The authorization platform 900 comprises an authorization processor 910 ("processor"), such as one or more commercially available Central Processing Units (CPUs) in the form of one-chip microprocessors, coupled to a communication device 920 configured to communicate via a communication network (not shown in FIG. 9). The communication device 920 may be used to communicate, for example, with one or more users. The authorization platform 900 further includes an input device 940 (e.g., a mouse and/or keyboard to enter information) and an output device 950 (e.g., to output the outcome of module execution).

The processor 910 also communicates with a memory/storage device 930. The storage device 930 may comprise any appropriate information storage device, including combinations of magnetic storage devices (e.g., a hard disk drive), optical storage devices, mobile telephones, and/or semiconductor memory devices. The storage device 930 may store a program 912 and/or authorization processing logic 914 for controlling the processor 910. The processor 910 performs instructions of the programs 912, 914, and thereby operates in accordance with any of the embodiments described herein. For example, the processor 910 may receive data and then may apply the instructions of the programs 912, 914 to determine whether a received part geometry is authorized for printing via an additive manufacturing machine.

The programs 912, 914 may be stored in a compressed, uncompiled and/or encrypted format. The programs 912, 914 may furthermore include other program elements, such as an operating system, a database management system, and/or device drivers used by the processor 910 to interface with peripheral devices.

As used herein, information may be "received" by or "transmitted" to, for example: (i) the platform 900 from another device; or (ii) a software application or module within the platform 900 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors 910 (FIG. 9). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A method comprising:
 receiving, by a communication interface of an authorization module comprising a processor, a part file with instructions to manufacture a part with an additive manufacturing machine;
 forwarding, by the communication interface of the authorization module, the part file to a geometric analysis module;
 generating, by the geometric analysis module, a shape signature for the part based on the part file;
 providing a signature storage entity storing one or more stored shape signatures, wherein the one or more stored shape signatures include at least one authorized-to-print stored shape signature and at least one unauthorized-to-print stored shape signature;
 determining, by a printing decision module, the generated shape signature of the part corresponds to the at least one authorized-to-print stored shape signature or the at least one unauthorized-to-print stored shape signature;
 transmitting, by the printing decision module, the determination to the authorization module; and
 receiving, by the authorization module, the determination of whether the generated shape signature of the part corresponds to the at least one authorized-to-print stored shape signature or the at least one unauthorized-to-print stored shape signature.

2. The method of claim 1, further comprising:
 recording the generated shape signature for the part in a secure ledger.

3. The method of claim 1, wherein the part file is one of a geometry file or a build file.

4. The method of claim 1, wherein determining the shape signature of the part corresponds to the one or more stored shape signatures further comprises:
 determining a probability the generated shape signature matches at least one stored shape signature; and
 determining whether the probability is statistically significant based on a statistical significance process.

5. The method of claim 4, wherein matching is one of exact or non-exact.

6. The method of claim 1, wherein generating the shape signature further comprises:
 receiving the part file at the geometric analysis module of the authorization module; and
 executing a shape characterization process.

7. The method of claim 1, wherein the shape signature is output as an array of data histogram.

8. The method of claim 1, wherein the shape signature includes one or more dimensions for the part.

9. The method of claim 8, wherein each of the one or more dimensions include a weight.

10. The method of claim 9, wherein determining the generated shape signature corresponds to at least one stored shape signatures further comprises:
 determining a probability that each of the dimensions of the generated shape signature matches at least one of the dimensions of the stored shape signatures;
 determining whether the probability is statistically significant based on a statistical significance process; and
 receiving the determined probability and determined statistical significance at a weighting process.

11. The method of claim 1, wherein the shape signature corresponds to at least one stored shape signature when a threshold is reached.

12. The method of claim 1, further comprising:
 printing the part with the additive manufacturing machine when the printing decision module receives the determination that the generated shape signature of the part corresponds to the at least one authorized-to-print stored shape signature.

13. The method of claim 1, further comprising:
 preventing the generated shape signature from being used to print the part with the additive manufacturing machine when the printing decision module receives the determination that the generated shape signature of the part corresponds to the at least one unauthorized-to-print stored shape signature.

14. A system comprising:
 an authorization module including a printing decision module and a geometric analysis module;
 an authorization processor; and
 a memory storing program instructions, the authorization processor and the authorization module operative with the program instructions to perform functions as follows:
 receive a part file with instructions to manufacture a part with an additive manufacturing machine;
 forward the part file to the geometric analysis module;

generate, by the geometric analysis module, a shape signature for the part based on the part file;

provide a data store storing one or more stored shape signatures, wherein the one or more stored shape signatures include at least one authorized-to-print stored shape signature and at least one unauthorized-to-print stored shape signature;

determine, by the printing decision module, the generated shape signature of the part corresponds to the at least one authorized-to-print stored shape signature or the at least one unauthorized-to-print stored shape signature; and receive, by the authorization module, the determination of whether the generated shape signature of the part corresponds to the at least one authorized-to-print stored shape signature or the at least one unauthorized-to-print stored shape signature.

15. The system of claim 14, further comprising program instructions to perform functions as follows:

record the generated shape signature for the part in a secure, ledger.

16. The system of claim 14, wherein determining the shape signature of the part corresponds to the one or more stored shape signatures further comprises program instructions to perform functions as follows:

determine a probability the generated shape signature matches at least one of the one or more stored shape signatures; and determine whether the probability is statistically significant based on a statistical significance process.

17. The system of claim 14, wherein the shape signature includes one or more dimensions for the part, and wherein each of the one or more dimensions include a weight.

18. The system of claim 17, wherein determining the generated shape signature corresponds to at least one stored shape signatures further comprises program instructions to perform functions as follows:

determine a probability that each of the weighted dimensions of the generated shape signature matches at least one of a plurality of weighted dimensions of the stored shape signatures;

determine whether the probability is statistically significant based on a statistical significance process;

receive the determined probability and determined statistical significance at a weighting process;

executing the weighting process to output a final probability; and comparing the final probability to a pre-defined threshold.

19. A non-transitory computer-readable medium storing instructions that, when executed by a computer processor, cause the computer processor to perform a method comprising:

receiving, via a communication interface of an authorization module comprising a processor, a part file with instructions to manufacture a part with an additive manufacturing machine;

forwarding the part file to a geometric analysis module;

generating, by the geometric analysis module, a shape signature for the part based on the part file;

providing a data store storing one or more stored shape signatures, wherein the one or more stored shape signatures includes at least one authorized-to-print stored shape signature and at least one unauthorized-to-print stored shape signature;

determining, by a printing decision module, the generated shape signature of the part corresponds to the at least one authorized-to-print stored shape signature or the at least one unauthorized-to-print stored shape signature;

transmitting, by the printing decision module, the determination to the authorization module; and receiving, by the authorization module, the determination of whether the generated shape signature of the part corresponds to the at least one authorized-to-print stored shape signature or the at least one unauthorized-to-print stored shape signature.

20. The medium of claim 19, further comprising:

recording the generated shape signature for the part in a secure, ledger.

\* \* \* \* \*